(12) United States Patent
Sugo et al.

(10) Patent No.: US 6,706,841 B2
(45) Date of Patent: Mar. 16, 2004

(54) SOLVENTLESS POLYIMIDE SILICONE RESIN COMPOSITIONS

(75) Inventors: Michihiro Sugo, Gunma-ken (JP); Akira Yamamoto, Gunma-ken (JP); Hideto Kato, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/140,251

(22) Filed: May 8, 2002

(65) Prior Publication Data

US 2002/0188069 A1 Dec. 12, 2002

(30) Foreign Application Priority Data

May 8, 2001 (JP) ........................................ 2001-137046

(51) Int. Cl.[7] .............................................. C08G 77/26
(52) U.S. Cl. ......................................... 528/26; 522/148
(58) Field of Search .............................. 522/148; 528/26

(56) References Cited

U.S. PATENT DOCUMENTS

5,472,823 A * 12/1995 Hagiwara et al. ........... 430/270
6,001,534 A * 12/1999 Kato ........................ 430/283.1

FOREIGN PATENT DOCUMENTS

| EP | 0 349 010 A1 | 1/1990 |
| JP | 5-140525 | 6/1993 |
| JP | 6-287523 | 10/1994 |

OTHER PUBLICATIONS

JP 6–287523, English language translation, Nov. 1994.*
JP 5140525, abstract, Jun. 1993.*

* cited by examiner

Primary Examiner—Margaret G. Moore
(74) Attorney, Agent, or Firm—Birch, Stewart, Kolasch & Birch, LLP

(57) ABSTRACT

A polyimide silicone resin composition comprising a polyimide silicone resin having recurring units of formula (1), a (meth)acrylic compound, and a polymerization initiator has fluidity at 25° C. despite the substantially absence of a solvent. In formula (1), X is a tetravalent organic group, Y is a divalent organic group, Z is a divalent organic group having an organosiloxane structure, p and q are positive numbers. The composition using the reactive (meth)acrylic compound as a diluent for the polyimide silicone resin is substantially free of a solvent and thus eliminates the step of solvent removal while it is highly adherent to various shapes of substrates

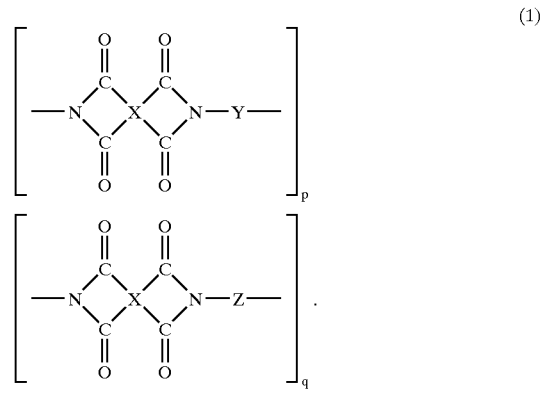

12 Claims, No Drawings

SOLVENTLESS POLYIMIDE SILICONE RESIN COMPOSITIONS

This invention relates to substantially solventless polyimide silicone resin compositions useful as coating materials and adhesives, and resin coatings obtained by curing.

BACKGROUND OF THE INVENTION

In general, polyimide resins have high heat resistance and good electrical insulation, and find use in printed circuit boards and heat resistant adhesive tape. They are also used as resin varnish to form surface protective films and interlayer insulating films for electric parts and semiconductor materials. Polyimide resins, however, are soluble in a limited number of solvents. Accordingly, it is a common practice to coat the adherend with a solution of polyamic acid, a polyimide precursor which is relatively soluble in a variety of solvents, and treat the coating at elevated temperatures to effect dehydration and cyclization into a polyimide resin.

Also, for the purpose of improving the solubility of polyimide resins in solvents, the adhesion thereof to substrates and imparting flexibility thereto, it has been a practice to introduce siloxane chains into polyimide skeletons.

Where it is desired to utilize the polyimide resin in a fluid form, the resin must be diluted with a solvent. This necessitates the step of removing the solvent after the polyimide resin solution is applied or coated to substrates.

JP-A 6-287523 discloses that a heat resistant adhesive film is obtained by adding an acrylic compound to a polyimide resin solution, effecting polymerization and removing the solvent. This adhesive film is a composite material of polyimide and acrylic polymer. It is effective for adhesion on relatively flat areas such as interlayer adhesion, but inadequate for coating on complex configured members such as electric parts and printed circuit boards and in the application requiring flow such as underfill.

SUMMARY OF THE INVENTION

An object of the invention is to provide a polyimide silicone resin composition which is substantially solventless while maintaining fluidity, thus eliminates the step of solvent removal, and is highly adherent to substrates of various shapes; and a resin coating obtained by curing the composition.

It has been found that when a (meth)acrylic compound which is a reactive compound is added as a diluent to a polyimide silicone resin composition, there is obtained a solventless polyimide silicone resin composition which is highly adherent to substrates of various shapes and eliminates the step of solvent removal at the end of operation such as coating.

According to the invention, there is provided a solventless polyimide silicone resin composition comprising a polyimide silicone resin having recurring units of the general formula (1), a (meth)acrylic compound, and a polymerization initiator. The composition has fluidity at 25° C. and is substantially free of a solvent.

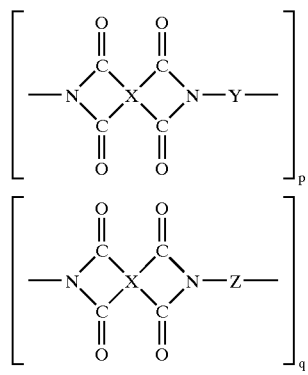

(1)

Herein X is a tetravalent organic group, Y is a divalent organic group, Z is a divalent organic group having an organosiloxane structure, p and q are positive numbers.

A resin coating is obtained by curing the solventless polyimide silicone resin composition with light or electron beams.

DESCRIPTION OF THE PREFERRED EMBODIMENTS

The solventless polyimide silicone resin composition of the invention contains a polyimide silicone resin, a (meth)acrylic compound, and a polymerization initiator.

The polyimide silicone resin used herein is comprised of recurring units of the general formula (1).

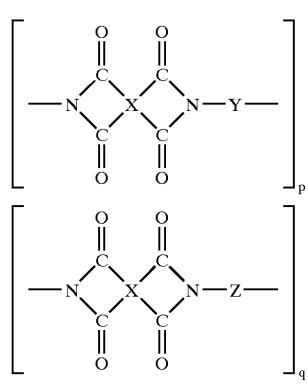

(1)

Herein X is a tetravalent organic group, Y is a divalent organic group, Z is a divalent organic group having an organosiloxane structure, p and q are positive numbers.

In formula (1), X is a tetravalent organic group which may originate from an aromatic acid dianhydride such as 3,3',4,4'-diphenylsulfonetetracarboxylic acid dianhydride, 3,3',4,4'-biphenyltetracarboxylic acid dihydrate, 4,4'-hexafluoropropylidene bisphthalic acid dianhydride or 3,3',4,4'-diphenyl ether tetracarboxylic acid dianhydride. Especially X is a tetravalent organic group of the following formula (2), (3) or (4).

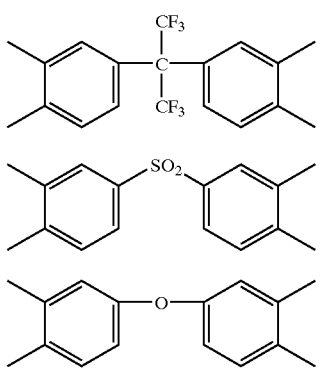
(2)

(3)

(4)

Y may originate from aromatic diamines such as 2,2-bis [4-(4-aminophenoxy)phenyl]propane, 2,2-bis[4-(4-aminophenoxy)phenyl]hexafluoropropane, bis[4-(4-aminophenoxy)phenyl]sulfone, bis[4-(3-amino-phenoxy) phenyl]sulfone, 1,4-bis(4-aminophenoxy)benzene, 1,3-bis (4-aminophenoxy)benzene, 4,4'-bis(4-aminophenoxy)-biphenyl 2,2-bis(4-aminophenyl)hexafluoropropane, and 2,2-bis(4-aminophenyl)propane; and diamines having a functional group other than amino, such as 3,3'-dihydroxy-4,4'-diaminobiphenyl, 2,2-bis(3-hydroxy-4-aminophenyl)-propane, 2,2-bis(3-amino-4-hydroxyphenyl) hexafluoropropane, and bis(3-carbonyl-4-aminophenyl) methane. These may be used alone or in admixture of two or more. Preferably Y is a divalent organic group of the following general formula (5) or (9).

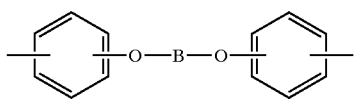
(5)

Herein B is a group of the following formula (6), (7) or (8).

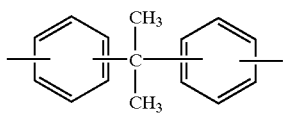
(6)

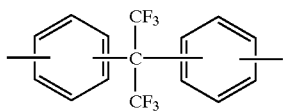
(7)

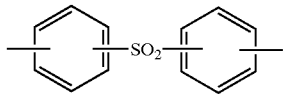
(8)

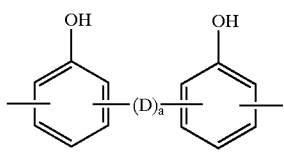
(9)

Herein D is —$CH_2$—, —$(CH_3)_2C$— or —$(CF_3)_2C$—, and "a" is 0 or 1.

Z is preferably a divalent siloxane residue of the following general formula (10) which originates from a diaminosiloxane of the following general formula (13), or a mixture of such siloxane residues.

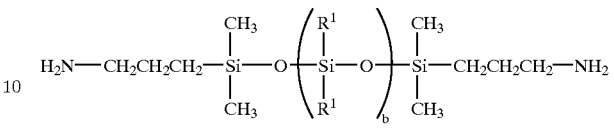
(13)

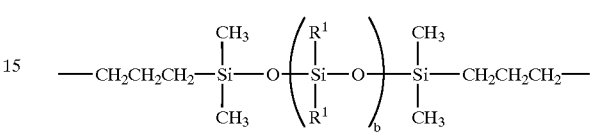
(10)

Herein $R^1$ which may be the same or different is an alkyl group of 1 to 3 carbon atoms or phenyl group, and "b" is an integer of 0 to 40, preferably 3 to 20.

The polyimide silicone resin comprising units of formula (1) can be obtained by reacting the acid dianhydride with the diamine and the diaminosiloxane described above. The proportion of the organosiloxane component in the polyimide silicone resin is desirably at least 30% by weight, and more desirably at least 40% by weight. With less than 30% of the organosiloxane component, the resulting polyimide silicone resin composition may not flow at 25° C. The upper limit may be suitably selected although the preferred proportion of the organosiloxane component is up to 90% by weight, especially up to 80% by weight based on the polyimide silicone resin. While p and q in formula (1) are positive numbers, they are preferably selected such that the proportion of the organosiloxane component in the polyimide silicone resin may fall in the above range, and specifically, q/(p+q) may fall in the range of 0.1 to 0.95, especially 0.2 to 0.85.

The polyimide silicone resin used herein preferably has a weight average molecular weight (Mw) of about 5,000 to 100,000, and more preferably about 10,000 to 70,000. With Mw<5,000, the polyimide silicone resin composition may form a cured coating which is brittle. With Mw>100,000, the polyimide silicone resin may be less compatible with the acrylic compound.

A well-known method may be used in preparing the polyimide silicone resin. First, the acid dianhydride, diamine and diaminopolysiloxane are dissolved in a solvent and reacted at a low temperature of about 20 to 50° C., forming a polyamic acid which is a polyimide resin precursor.

The polyamic acid solution thus obtained is then heated, preferably at a temperature of 80 to 200° C., especially 140 to 180° C., at which temperature the acid amide of polyamic acid undergoes dehydration ring-closure reaction, yielding a polyimide silicone resin solution. This solution is poured into a solvent such as water, methanol, ethanol or acetonitrile for precipitation. The precipitate is dried, obtaining the end polyimide silicone resin.

The proportion of the diamine and diaminopolysiloxane combined relative to the tetracarboxylic acid dianhydride, which may be properly determined in accordance with the molecular weight of a polyimide silicone resin to be prepared, is preferably 0.95 to 1.05, especially 0.98 to 1.02 in molar ratio.

For the preparation of the polyimide silicone resin, the solvent used is selected, for example, from N-methyl-2-pyrrolidone, cyclohexanone, γ-butyrolactone and N,N-dimethylacetamide.

To adjust the molecular weight of the polyimide silicone resin, a compound having a monofunctional group such as phthalic anhydride or aniline may be added to the reaction mixture. The preferred amount of the monofunctional compound added is up to 2 mol % based on the polyimide silicone resin.

In an alternative procedure, an acetic anhydride/pyridine mixture is added to the polyamic acid solution, and the resulting solution is heated around 50° C. for effecting imidization.

In the polyimide silicone resin composition of the invention, a (meth)acrylic compound is blended. The (meth) acrylic compounds designate acrylates and methacrylates and can dissolve the polyimide silicone resin. The (meth) acrylic compounds used herein are preferably (meth) acrylates of the following general formulae (11) and (12).

$$CH_2=CR^3COOR^2 \quad (11)$$

$$CH_2=CR^3CONR^2_2 \quad (12)$$

Herein $R^2$ is an alkyl group, preferably having 1 to 20 carbon atoms, more preferably 1 to 10 carbon atoms, and $R^3$ is hydrogen or methyl.

Illustrative examples of the (meth)acrylate (11) include methyl acrylate, ethyl acrylate, isobutyl acrylate and isobornyl acrylate. Illustrative of the (meth)acrylate (12) are N,N-dimethylacrylamide and N,N-diethylacrylamide.

For enhancing adhesion to substrates and improving physical properties, the acrylic compound may also be selected from vinyl compounds such as N-vinylpyrrolidone; epoxy-containing acrylic compounds such as glycidyl acrylate and 3,4-epoxycyclohexylmethyl acrylate; hydroxyl-containing acrylic compounds such as 2-hydroxyethyl acrylate, 2-hydroxypropyl acrylate and 2-hydroxybutyl acrylate; fluorinated alkyl acrylic compounds such as trifluoropropyl acrylate, perfluorobutyl ethyl acrylate and perfluorooctyl ethyl acrylate; acrylic silanes such as acryloxypropyltrimethoxysilane and acryloxypropylmethyldimethoxysilane; and acrylic silicones such as acrylic group-containing organopolysiloxanes. These acrylic compounds may be used alone or in admixture of two or more.

Examples of useful methacrylic compounds include methyl methacrylate, ethyl methacrylate, isobutyl methacrylate, isobornyl methacrylate, glycidyl methacrylate, 3,4-epoxycyclohexylmethyl methacrylate, 2-hydroxyethyl methacrylate, 2-hydroxypropyl methacrylate, 2-hydroxybutyl methacrylate, trifluoropropyl methacrylate, perfluorobutylethyl methacrylate, perfluorooctylethyl methacrylate, methacryloxypropyltrimethoxysilane, methacryloxypropylmethyldimethoxysilane, and methacrylic silicones such as methacrylic group-containing organopolysiloxanes.

Besides the mono(meth)acrylates, any of di(meth) acrylates and polyfunctional (meth)acrylates may be added for the purpose of improving strength and adhesion.

The inventive composition contains a polymerization initiator. Any polymerization initiator may be used as long as it can impart a polymerization ability to (meth)acrylic compounds which are not reactive under desired conditions in the absence of a polymerization initiator. Heat-polymerization initiators and photo-polymerization initiators are exemplary. A photopolymerization initiator selected from among acetophenone derivatives, benzophenone derivatives, benzoin ether derivatives, and xanthone derivatives is preferred for productivity and fast curing.

Illustrative, non-limiting examples include diethoxyacetophenone, 2-hydroxy-2-methyl-1-phenylpropan-1-one, 2,2-dimethoxy-2-phenylacetophenone, 1-hydroxy-cyclohexyl phenyl ketone, isobutyl benzoin ether, benzoin methyl ether, thioxanthone, isopropylthioxanthone, 2-methyl-1-[4-(methylthio)phenyl]-2-morpholinopropan-1-one, and 2-benzyl-2-dimethylamino-1-(4-morpholinophenyl)-butanone-1.

The polyimide silicone resin, (meth)acrylic compound and polymerization initiator may be used in any desired proportion as long as the resulting polyimide silicone resin composition has fluidity. The preferred proportion is 10 to 80% by weight of the polyimide silicone resin, 5 to 90% by weight of the (meth)acrylic compound and 0.1 to 10% by weight of the polymerization initiator. To facilitate uniform mixing of the polyimide silicone resin, (meth)acrylic compound and polymerization initiator, a solvent may be added to assist uniform mutual dissolution. Thereafter, the solvent is distilled off, obtaining a polyimide silicone resin composition according to the invention. The solvent used to this end is preferably a low boiling solvent such as acetone, 2-butanone, ethyl acetate, ethyl ether or tetrahydrofuran.

On practical use of the polyimide silicone resin composition of the invention, it should preferably have a viscosity of up to 10,000 Pa·s at 25° C., more preferably 0.01 to 5,000 Pa·s at 25° C., most preferably 0.1 to 1,000 Pa·s at 25° C., for ease of handling.

For ameliorating the drawback of prior art polyimide silicone varnishes that need solvent dilution, the polyimide silicone resin composition of the invention uses the (meth) acrylic compound which is a reactive compound as the diluent, and provides a substantially solvent-free polyimide silicone varnish. The polyimide silicone resin composition of the invention readily cures upon exposure to light or electron beams to form a polyimide silicone/(meth)acrylic resin coating. The composition is thus advantageously used as an adhesive and coating material for devices where high reliability is required such as electric and electronic parts and semiconductor chips.

EXAMPLE

Examples are given below by way of illustration and not by way of limitation.

Example 1

A flask equipped with a stirrer, thermometer and nitrogen purge inlet was charged with 59.7 g (0.167 mol) of 3,3',4,4'-diphenylsulfonetetracarboxylic acid dianhydride and 400 g of cyclohexanone. Then, 116 g (0.133 mol) of both end amino-dimethylpolysiloxane (amine equivalent 435 g/mol) and 14.4 g (0.033 mol) of bis[4-(3-aminophenoxy)phenyl]-sulfone were dissolved in 50 g of cyclohexanone. This solution was added dropwise to the flask at such a controlled rate that the temperature of the reaction system might not exceed 50° C. After the completion of dropwise addition, agitation was continued at room temperature for 10 hours.

After a reflux condenser having a water trap was attached to the flask, 50 g of toluene was added. The flask was heated at 150° C. and maintained at the temperature for 6 hours, yielding a brown solution. The brown solution was cooled to room temperature (25° C.) and poured into methanol for precipitation. Once the precipitate was dried, a polyimide silicone resin having a siloxane content of 61% by weight was obtained.

The resin was analyzed by infrared (IR) absorption spectroscopy whereupon the absorption peak based on polyamic acid indicating the presence of unreacted functional groups did not develop, and instead, the absorption peaks attributable to imide group developed at 1780 cm$^{-1}$ and 1720 cm$^{-1}$. By gel permeation chromatography (GPC) using tetrahydrofuran as the solvent, the resin was measured to have a weight average molecular weight of 30,000 on a polystyrene standard.

The resin corresponds to formula (1) wherein X, Y and Z have the following structures and q/(p+q)=0.8.

X:

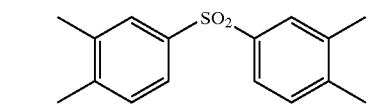

Y:

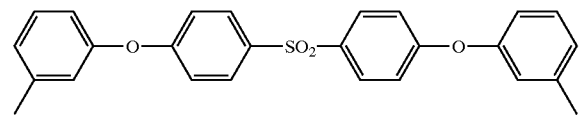

Z:

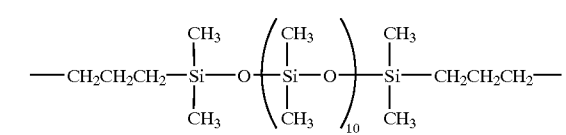

Next, 50 g of the polyimide silicone resin, 100 g of ethyl acrylate and 1 g of 2,2-dimethoxy-2-phenylacetophenone were stirred in a flask, obtaining an end polyimide silicone resin composition. This composition had a viscosity of 10 Pa·s at 25° C.

A cured coating of the polyimide silicone resin composition was evaluated for adhesion by a crosshatch peel test to be described below. The results are shown in Table 1.

In the crosshatch peel test, the polyimide silicone resin composition was applied onto a glass plate to a thickness of 0.1 mm and irradiated with UV from a high-pressure mercury lamp (integrated exposure 1,000 mJ/m$^2$), forming a cured coating. After the coated plate was exposed to hot humid conditions of 80° C. and RH 95% for 24 hours, the adhesion of the cured coating to the glass plate was examined by the crosshatch peel test JIS K5400.

Example 2

A flask equipped with a stirrer, thermometer and nitrogen purge inlet was charged with 51.7 g (0.167 mol) of 3,3',4,4'-diphenylsulfonetetracarboxylic acid dianhydride and 400 g of cyclohexanone. Then, 108.8 g (0.125 mol) of both end amino-siloxane (amine equivalent 435 g/mol) and 17.1 g (0.042 mol) of 2,2-bis[4-(4-aminophenoxy)phenyl]-propane were dissolved in 50 g of cyclohexanone. This solution was added dropwise to the flask at such a controlled rate that the temperature of the reaction system might not exceed 50° C. After the completion of dropwise addition, agitation was continued at room temperature for 10 hours.

After a reflux condenser having a water trap was attached to the flask, 50 g of toluene was added. The flask was heated at 150° C. and maintained at the temperature for 6 hours, yielding a yellowish brown solution. The solution was cooled to room temperature (25° C.) and poured into methanol for precipitation. Once the precipitate was dried, a polyimide silicone resin having a siloxane content of 54% by weight was obtained.

The resin was analyzed by IR spectroscopy whereupon the absorption peak based on polyamic acid indicating the presence of unreacted functional groups did not develop, and instead, the absorption peaks attributable to imide group developed at 1780 cm$^{-1}$ and 1720 cm$^{-1}$. By GPC using tetrahydrofuran as the solvent, the resin was measured to have a weight average molecular weight of 42,000 on a polystyrene standard.

The resin corresponds to formula (1) wherein X, Y and Z have the following structures and q/(p+q)=0.75.

X:

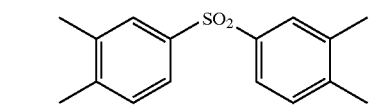

Y:

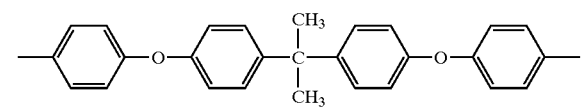

Z:

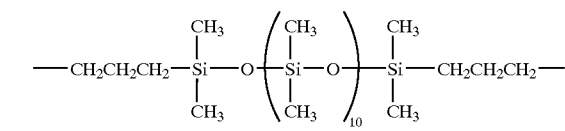

Next, 50 g of the polyimide silicone resin, 50 g of isobornyl acrylate, 1 g of 2,2-dimethoxy-2-phenylacetophenone and 50 g of acetone were stirred in a flask. Once uniformity was confirmed, the acetone was distilled off at 50° C./10 torr, obtaining an end polyimide silicone resin composition. This composition had a viscosity of 120 Pa·s at 25° C.

A cured coating of the polyimide silicone resin composition was evaluated for adhesion by the crosshatch peel test. The results are shown in Table 1.

Example 3

A flask equipped with a stirrer, thermometer and nitrogen purge inlet was charged with 74 g (0.167 mol) of 4,4'-hexafluoropropylidene bisphthalic acid dianhydride and 400 g of N-methyl-2-pyrrolidone. Then, 108.8 g (0.125 mol) of both end amino-siloxane (amine equivalent 435 g/mol) and 12.2 g (0.042 mol) of 1,3-bis(4-aminophenoxy)benzene were dissolved in 50 g of N-methyl-2-pyrrolidone. This solution was added dropwise to the flask at such a controlled rate that the temperature of the reaction system might not exceed 50° C. After the completion of dropwise addition, agitation was continued at room temperature for 10 hours.

After a reflux condenser having a water trap was attached to the flask, 50 g of toluene was added. The flask was heated at 150° C. and maintained at the temperature for 6 hours, yielding a yellowish brown solution. The solution was cooled to room temperature (25° C.) and poured into methanol for precipitation. Once the precipitate was dried, a polyimide silicone resin having a siloxane content of 63% by weight was obtained.

The resin was analyzed by IR spectroscopy whereupon the absorption peak based on polyamic acid indicating the presence of unreacted functional groups did not develop, and instead, the absorption peaks attributable to imide group developed at 1780 cm$^{-1}$ and 1720 cm$^{-1}$. By GPC using tetrahydrofuran as the solvent, the resin was measured to have a weight average molecular weight of 28,000 on a polystyrene standard.

The resin corresponds to formula (1) wherein X, Y and Z have the following structures and q/(p+q)=0.75.

X:

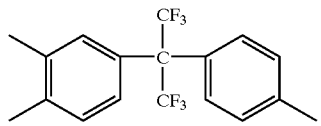

Y:

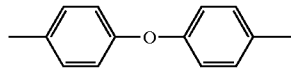

Z:

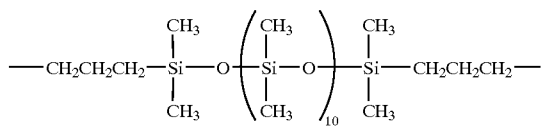

Next, 50 g of the polyimide silicone resin, 30 g of dimethyl acrylate, 1 g of 1-hydroxy-cyclohexylphenyl ketone and 50 g of acetone were stirred in a flask. Once uniformity was confirmed, the acetone was distilled off at 50° C./10 torr, obtaining an end polyimide silicone resin composition. This composition had a viscosity of 850 Pa·s at 25° C.

A cured coating of the polyimide silicone resin composition was evaluated for adhesion by the crosshatch peel test. The results are shown in Table 1.

TABLE 1

|  | Before exposure<br>Peeled sections/test sections | After exposure<br>Peeled sections/test sections |
| --- | --- | --- |
| Example 1 | 0/100 | 0/100 |
| Example 2 | 0/100 | 0/100 |
| Example 3 | 0/100 | 0/100 |

There has been described a polyimide silicone resin composition which uses a (meth)acrylic compound which is a reactive compound as a diluent for a polyimide silicone resin and is substantially free of a solvent. The composition eliminates the step of solvent removal and is highly adherent to various shapes of substrates.

Japanese Patent Application No. 2001-137046 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A solventless polyimide silicone resin composition comprising a polyimide silicone resin having recurring units of the general formula (1):

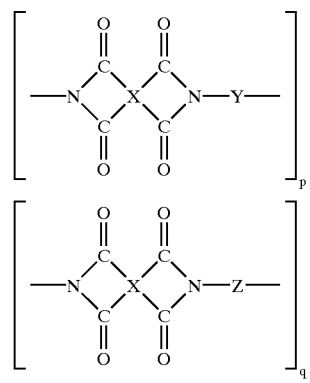

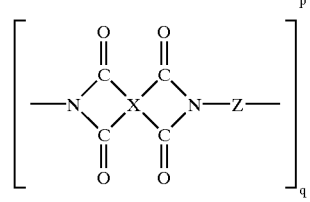

wherein X is a tetravalent organic group, Y is a divalent organic group, Z is a divalent organic group having an organosiloxane structure, p and q are positive numbers, a (meth)acrylic compound, and a polymerization initiator, the composition having viscosity of up to 10,000 Pa·s at 25° C. and being substantially free of a solvent.

2. The composition of claim 1 wherein

X is a tetravalent organic group of the following formula (2), (3) or (4):

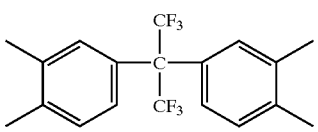

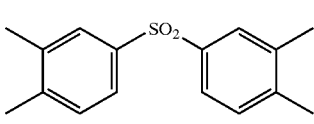

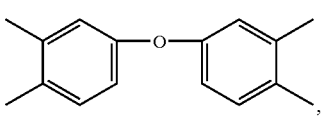

Y is a divalent organic group of the following general formula (5):

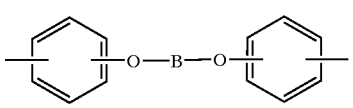

wherein B is a group of the following formula (6), (7) or (8):

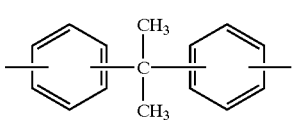

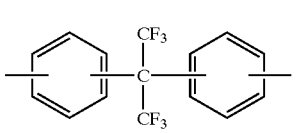

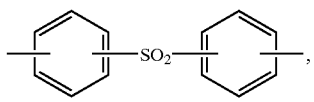

or a divalent organic group of the following general formula (9):

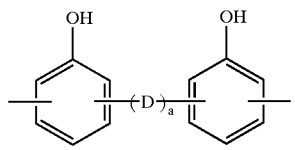

wherein D is —CH$_2$—, —(CH$_3$)$_2$C— or —(CF$_3$)$_2$C—, and "a" is 0 or 1, and Z is a divalent siloxane residue of the following general formula (10):

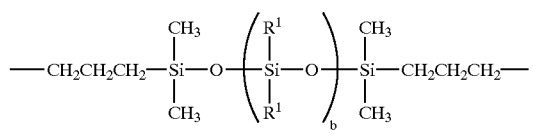

wherein R$^1$ is independently an alkyl group of 1 to 3 carbon atoms or phenyl group, and "b" is an integer of 0 to 40.

3. The composition of claim 1 wherein the (meth)acrylic compound is at least one of compounds having the following general formulae (11) and (12):

wherein R$^2$ is an alkyl group and R$^3$ is hydrogen or methyl.

4. The composition of claim 1 wherein the polymerization initiator is a photopolymerization initiator selected from the group consisting of an acetophenone derivative, benzophenone derivative, benzoin ether derivative, and xanthone derivative.

5. The composition of claim 1 wherein the polyimide silicone resin contains at least 30% by weight of an organosiloxane component.

6. The omposition of claim 5, wherein the upper limit of the organosiloxane 1s 80% by weight based on the polyimide silicone resin composition.

7. The composition of claim 1 wherein the polyimide silicone resin is present in an amount of 10 to 80% by weight of the composition.

8. The composition of claim 7, comprising 10 to 80% by weight polyimide silicone resin, 5 to 90% by weight of the (meth)acrylic compound, and 0.1 to 10% by weight of the polymerization initiator.

9. A resin coating obtained by curing a solventless polyimide silicone resin composition according to claim 1 with light or electron beams.

10. The resin coating of claim 9, obtain by curing the solventless polyimide silicone resin composition with ultraviolet (UV) light.

11. The composition of claim 1, having a viscosity of up to 1000 Pa·s at 25°C.

12. The composition of claim 1, wherein the polyidime silicone resin has a weight average molecular weight of about 5000 to 70,000.

* * * * *